United States Patent [19]
Yamazaki et al.

[11] Patent Number: 6,055,027
[45] Date of Patent: Apr. 25, 2000

[54] DISPLAY UNIT AND DISPLAY SYSTEM THEREOF

[75] Inventors: Shunpei Yamazaki, Tokyo; Yoshiharu Hirakata; Jun Koyama, both of Kanagawa, all of Japan

[73] Assignee: Semiconductor Energy Laboratory Co., Ltd., Kanagawa, Japan

[21] Appl. No.: 08/767,317

[22] Filed: Dec. 16, 1996

[30] Foreign Application Priority Data

Dec. 14, 1995 [JP] Japan ................................. 7-347755

[51] Int. Cl.[7] ................................. G02F 1/1335
[52] U.S. Cl. ................. 349/15; 349/96; 349/98; 349/117; 359/464; 358/3; 358/92
[58] Field of Search ............... 349/96, 98, 117, 349/15; 359/464; 358/92, 3

[56] References Cited

U.S. PATENT DOCUMENTS

| | | | |
|---|---|---|---|
| 4,792,850 | 12/1988 | Lipton et al. | 358/92 |
| 5,162,897 | 11/1992 | Jitsukata et al. | 358/3 |
| 5,568,314 | 10/1996 | Omori et al. | 359/464 |
| 5,589,956 | 12/1996 | Morishima et al. | 359/15 |
| 5,644,427 | 7/1997 | Omori et al. | 359/464 |

*Primary Examiner*—William L. Sikes
*Assistant Examiner*—Julie Ngo
*Attorney, Agent, or Firm*—Fish & Richardson P.C.

[57] ABSTRACT

A display unit which allows image lights utilizing circularly polarized light to be transmitted to an observer without degrading its polarization characteristics by an optical system such as lenses and screen is provided. The display unit which allows an image to be observed from the back of the screen on the opposite side from a light source by forming the image on the surface of the screen via the light source comprises a first liquid crystal panel for displaying images; a second liquid crystal panel for displaying images disposed so as to adjoin to the first liquid crystal panel; means for projecting linearly polarized image lights output respectively from the first and second liquid crystal panels on the surface of the screen simultaneously so that their polarization directions differ from each other; and means provided in the screen for transforming the projected linearly polarized lights into circularly polarized lights.

27 Claims, 12 Drawing Sheets

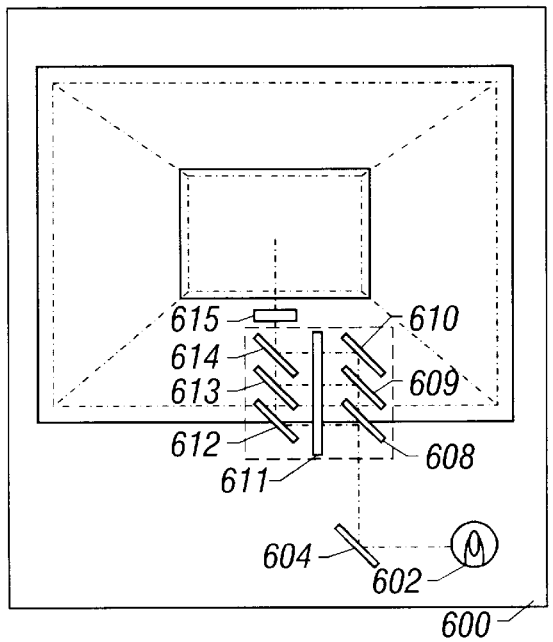
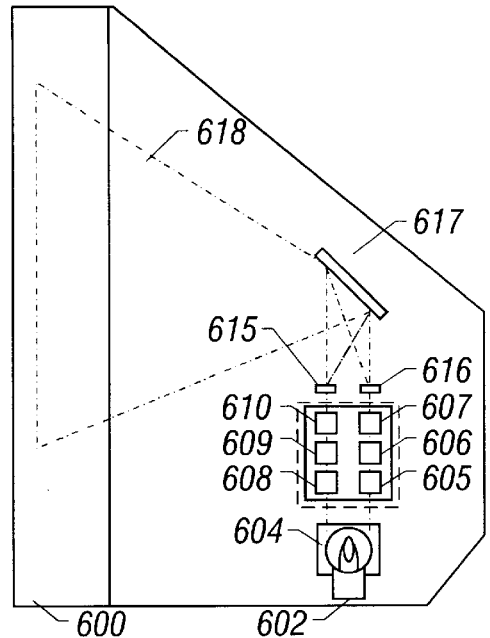
FIG. 12A
FIG. 12C
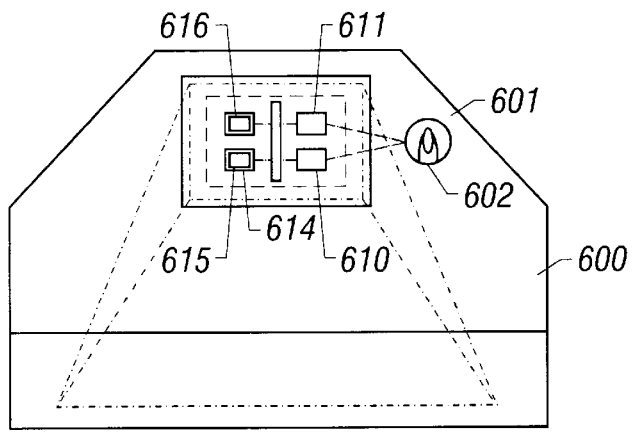
FIG. 12B

DISPLAY UNIT AND DISPLAY SYSTEM THEREOF

BACKGROUND OF THE INVENTION

1. Field of the Invention

The present invention relates to a display unit and a display system thereof which allow a stereoscopic image or different images to be displayed on the same screen.

2. Description of Related Art

Hitherto, there has been known a technology for obtaining stereoscopic images by forming images for right and left eyes by utilizing two projectors and by viewing them by right and left eyes, respectively (see Chihiro Masuda, Three-Dimensional Display, Sangyo Publishing Co., 1990).

There have been also known a front projection method and a rear projection method as methods for displaying stereoscopic images. It has been common so far that the front projection method projecting stereoscopic images on a silver screen is performed to show to many people in events or the like.

On the other hand, the rear projection method of projecting polarized stereoscopic images has been very rare so far. Because the polarization characteristics of the image light degrades in passing through the screen due to scattering and the like, thus failing to give stereoscopic view or causing after-image and dark screen. It has been difficult to let the light pass through the screen while maintaining the polarization characteristics, especially when circularly polarized light is used.

SUMMARY OF THE INVENTION

Accordingly, it is an object of the present invention to solve the aforementioned problems of the rear projection method by providing means which allows to transmit image lights using circularly polarized light to observers without degrading the polarization characteristics by an optical system such as lenses and the screen.

According to the present invention, a display unit is provided with first and second liquid crystal panels for displaying images, and linearly polarized image lights output respectively from each of the liquid crystal panels are projected onto the surface of a screen so that their polarization directions differ from each other. Then, the projected linearly polarized lights pass through the screen after transforming into circularly polarized lights by transformation means provided in the screen. Thereby, the circularly polarized image lights may be transmitted to the observers without degrading the polarization characteristics by the optical systems such as lenses and screen.

In the concrete, the transformation means is a quarter wavelength plate and the projecting means projects each of the linearly polarized image lights onto the screen so that the polarization axis of the image lights make an angle of 45° with an optical axis of the quarter wavelength plate. At this time, it is preferable to dispose the quarter wavelength plate on the back of the screen so that the image light which has transmitted from the front (light source side) surface of the screen in the linearly polarized state reaches to an observer after transforming into the circularly polarized light at the back of the screen.

Further, according to the present invention, the observer can enjoy to select various modes by switching them by one display unit from either a first mode which allows images to be displayed stereoscopically, a second mode which allows different observers to observe different images and a third mode for superimposing and displaying the same images.

In the concrete, the display unit of the present invention comprises a first liquid crystal panel for displaying images and a second liquid crystal panel for displaying images disposed adjacent to the first liquid crystal panel. And the linearly polarized image lights outputs are projected from the first and second liquid crystal panels, respectively, on the light source side surface of the screen simultaneously so that their polarization directions differ from each other. Then, transformation means provided in the screen transforms the projected linearly polarized lights into circularly polarized lights.

This transformation means is a quarter wavelength plate and the projecting means projects each of the linearly polarized image lights onto the screen so that the polarization axis of the image lights make an angle of 45° with an optical axis of the quarter wavelength plate. At this time, it is preferable to dispose the quarter wavelength plate on the back of the screen so that the image light which has transmitted from the light source side surface of the screen in the linearly polarized state reaches to an observer after transforming into the circularly polarized light.

In the present invention, the quarter wavelength plate is provided within the screen itself, because the polarization characteristics of the image light in passing through the screen degrade by scattering and the like. Thus failing to view stereoscopic images or causing after-image or darkness if the quarter wavelength plate is separated from the screen and is disposed in front of the screen (on the light source side). It is particularly difficult to let the image light pass through the screen while maintaining the polarization characteristics when circularly polarized light is used. Then, the quarter wavelength plate is provided within the screen itself to allow the circularly polarized image light to be transmitted to the observer without degrading the polarization characteristics by the optical systems such as the lenses and screen.

Further, it is preferable to construct the projecting means described above by combining a plurality of polarization plates. In concrete, the projecting means is constructed by combining a first polarization plate disposed on the light source side of the first liquid crystal panel; a second polarization plate which is disposed on the screen side of the first liquid crystal panel and whose polarization direction makes an angel of 90° with that of the first polarization plate; a third polarization plate disposed on the light source side of the second liquid crystal panel; and a fourth polarization plate which is disposed on the screen side of the second liquid crystal panel and whose polarization direction makes an angle of 90° with that of the third polarization plate. It is noted that the orientation of liquid crystal of the first and second liquid crystal panels is different by 90° from each other.

It is preferable to provide the screen with, besides the quarter wavelength plate, an image-formation film for forming images; a Fresnel lens provided on the light source side toward the image-formation film; and a lenticular lens provided on the observer side with respect to the image-formation film.

Further, in a display system of the present invention, an observer watches images from the back of the screen by wearing special glasses. The glasses have a function of selectively separating the image lights for right and left eyes, respectively from the first and second liquid crystal panels which have passed the screen. Thereby, it allows stereoscopic images to be observed.

In the concrete, circularly polarizing means by which directions of rotation of circularly polarized light differ each other for the right eye and left eye and linearly polarizing means by which polarization directions of linearly polarized lights differ each other for the right eye and left eye are provided respectively in the glasses. The combination of the circularly polarizing means and the linearly polarizing means allows the image which has passed through the screen to be observed.

Further, the inventive display system allows different images to be observed among a first observer and a second observer. In this case, different glasses are allotted to the first and second observers, respectively. In the concrete, first glasses is selectively transmitting the image light of the first liquid crystal panel and second glasses id selectively transmitting the image light of the second liquid crystal panel to the second observer, respectively. Here, in the first and second glasses, circularly polarizing means for different directions of rotation of circularly polarized lights differ each other and linearly polarizing means by which polarization directions of linearly polarized lights differ each other are provided.

Further, in the inventive display system, the same images are displayed respectively on the first and second liquid crystal panels and the same images are superimposed and displayed on the screen, simultaneously. Thereby, the observer can see the image without wearing the special glasses. Even more, the brightness of the image is doubled as compared to a case when one liquid crystal panel is used. Images of TV, VTR, personal computer (PC) and the like are conceivable for example as such images. Moreover, the apparent resolution of the image may be enhanced by projecting the same images to the screen simultaneously while shifting either image of the first or second liquid crystal panel in the horizontal or vertical direction by a length of a pixel. For example, if the image from the second liquid crystal panel is projected to the screen so as to cover the space between the first image pixels which are adjacent vertically, the vertically resolution of a whole image increases twice. While they are the same images, it is also possible to enhance an angle of visibility because left or right turn circularly polarized image light is used.

In the inventive display unit, it is possible to select various operation modes by one display unit. That is, it is possible to select either a first mode which allows images to be displayed stereoscopically, a second mode which allows different images to be observed among different observers, respectively, and a third mode for superimposing and displaying the same images.

In the concrete, the observer selects a desirable mode by mode selection means at first. When the first mode for displaying images stereoscopically is selected, display control means causes the images for right and left eyes to be displayed on the first and second liquid crystal panels, respectively, by the stereoscopic display control means.

When the second mode which different images are observed among different observers is selected, the display control means causes desired different images from the input means in order to display the different images on the first and second liquid crystal panels respectively.

When the third mode for superimposing and displaying the same images is selected, the display control means causes the same images t from the input means in order to display on the first and second liquid crystal panels simultaneously. Thus, it becomes possible to display multi-purpose images by one display unit.

The specific nature of the invention, as well as other objects, uses and advantages thereof, will clearly appear from the description and from the accompanying drawings.

BRIEF DESCRIPTION OF DRAWINGS

FIG. 12 is a diagram showing a concrete structure of the display unit.

DESCRIPTION OF PREFERRED EMBODIMENT

Figure 1:
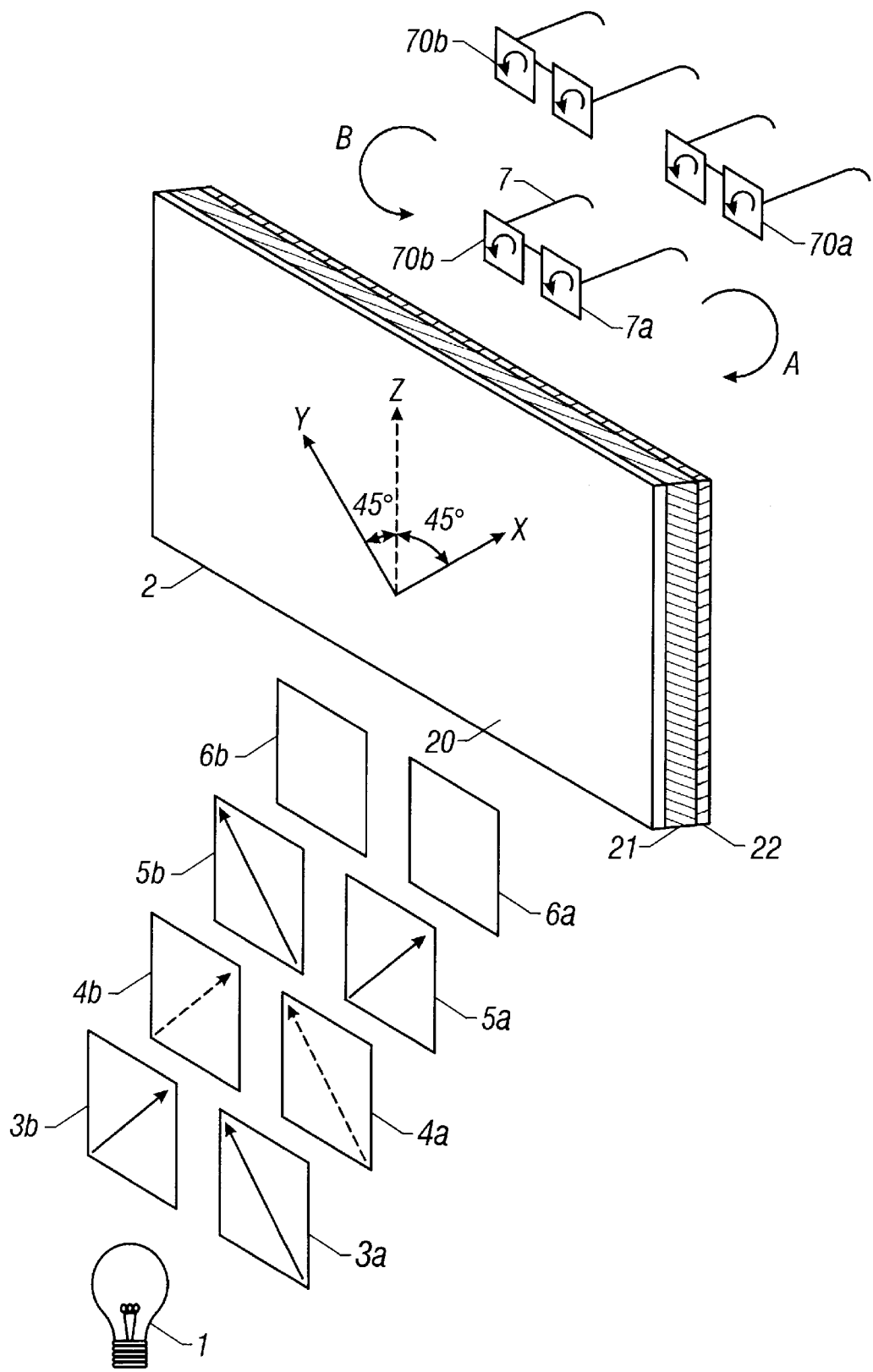
FIG. 1 is a diagrammatic view showing an optical system of a display unit of the present invention.

FIG. 1 shows a preferred embodiment of an optical system of a display unit of the present invention. The inventive display unit is of the so-called rear projection method which allows an image to be observed from the back of a screen, i.e. on the opposite side from a light source, by forming the image on the surface of the screen via the light source. Polarization plates 3a, 3b, 5a, and 5b, liquid crystal panels 4a and 4b, and lenses 6a and 6b for displaying images are disposed respectively at right and left between the light source 1 and the screen 2. In the concrete, the polarization plate 3a, the liquid crystal panel 4a, the polarization plate 5a and the lens 6a are disposed respectively in the order from the light source side in the right optical system and the polarization plate 3b, the liquid crystal panel 4b, the polarization plate 5b and the lens 6b are disposed respectively in the order from the light source side in the left optical system.

The polarization plates 3a and 3b have polarization directions as indicated by solid line arrows (which make an angle of 90° each other). The polarization plates 5a and 5b also have polarization directions as indicated by solid line arrows (which make an angle of 90° each other). Meanwhile, each of the liquid crystal panels 4a and 4b has orientations as indicated by dot lines (differ by 90° from each other). The screen 2 is composed of an image-formation film 20, an acryl 21 and a quarter wavelength film 22 (or quarter wavelength plate). The quarter wavelength film 22 transforms linearly polarized light into circularly polarized light.

In the system constructed as described above, each of linearly polarized image lights output respectively from the liquid crystal panels 4a and 4b is projected simultaneously onto the surface of the screen 2 via the right or left optical systems such that their polarization directions differ by 45° with respect to an optical axis of the quarter wavelength film 22. Then, the projected linearly polarized lights are transformed into circularly polarized light by the quarter wavelength film 22 provided in the screen 2. The quarter wavelength film 22 is disposed on the back of the screen 2 and transforms the image lights which have transmitted from the light source side surface of the screen 2 in the state of linearly polarized light into the circularly polarized light at the back of the screen 2.

An operation of the present embodiment will be explained below. At first, an operation in observing a stereoscopic image will be explained. Assuming here that the liquid crystal panels 4a and 4b display images for left eye and right eye, respectively, an observer observes those images by wearing special glasses 7 from the back of the screen 2. The glasses 7 have a function of selectively separating the image lights of the liquid crystal panels 4a and 4b which have passed through the screen 2 for the left eye and for the right eye. In the concrete, the glasses 7 are provided with circularly polarizing films whose directions of rotation of the circularly polarized lights are different from each other for the left eye 7a and the right eye 7b, respectively (e.g. a left turn circularly polarizing film is used for the right eye and a right turn circularly polarizing film is used for the left eye). And the glasses are also having linearly polarizing films whose optical axis of linearly polarized lights make an angle of 45° with the optical axis of the circularly polarizing film, respectively.

Two linearly polarized images having polarization directions indicated by arrows X and Y in FIG. 1 (which make an angel of 45° with an optical axis Z of the quarter wavelength film 22, respectively, and which make an angle of 90° each other) are superimposed and displayed on the screen 2. These linearly polarized images pass through the screen 2 while being transformed, by the quarter wavelength film 22, into the circularly polarized lights whose directions of rotation differ from each other. The image lights which have thus passed the screen 2 are selectively separated by the glasses 7 having the glass for left eye 7a and the glass for right eye 7b. That is, for the observer wearing the glasses 7, the image formed in the liquid crystal panel 4a enters the left eye and the image formed in the liquid crystal panel 4b enters the right eye selectively. Thus, the observer wearing the glasses 7 can see a stereoscopic image selectively.

Figure 2:
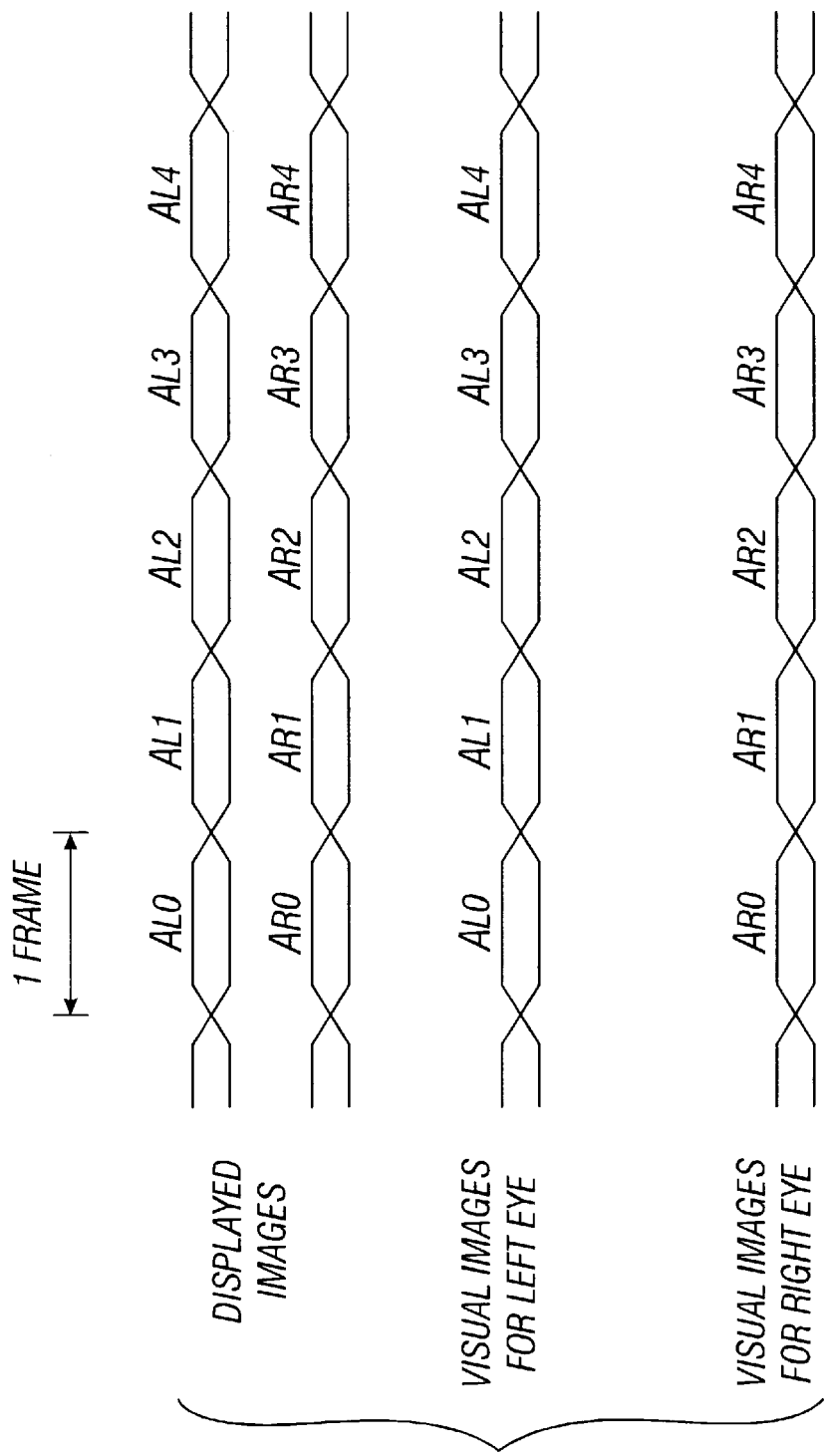
FIG. 2 is a time chart displaying stereoscopic images (first mode)

This operation will be explained with reference to a time chart in FIG. 2.

Image data of AL0, AL1, AL2, AL3, AL4, . . . , i.e. images for the left eye, are displayed from the liquid crystal panel 4a and image data of AR0, AR1, AR2, AR3, AR4, . . . , i.e. images for the right eye, are displayed from the liquid crystal panel 4b. Then, the images of AL0, AL1, AL2, AL3, AL4, . . . enter the left eye and the images of AR0, AR1, AR2, AR3, AR4, . . . enter the right eye selectively by wearing the glasses 7. It becomes possible to observe the stereoscopic image by wearing the glasses 7 having the circularly polarizing films and the linearly polarizing films, without being influenced by an inclination of the observer's head.

Next, an operation of second mode for causing a first observer and a second observer to observe different images will be explained. Different images are displayed by the liquid crystal panels 4a and 4b, respectively, and the first and second observers watch the different images from the back of the screen 2 by wearing special glasses 70a and 70b, respectively. At this time, the first observer wears the glasses 70a which selectively separates the image light of the liquid crystal panel 4a and the second observer wears the glasses 70b which selectively separates the image light of the liquid crystal panel 4b from the displayed image. Here, the glasses 70a and 70b are provided with circularly polarizing films whose directions of rotation of the circularly polarized lights are different from each other and linearly polarizing films whose optical axis of linearly polarized lights make an angle of 45° with the optical axis of the circularly polarizing film, respectively.

Linearly polarized images which have been formed by being optically modulated by the liquid crystal panels 4a and 4b are superimposed and displayed on the screen 2 via the lenses 6a and 6b. Their polarization directions are indicated by arrows X and Y in FIG. 1 (which make an angle of 45° with an optical axis Z of the quarter wavelength film 22, respectively). That is, the image which has been formed on the liquid crystal panel 4a is simultaneously projected onto the screen 2 as having the linearly polarized direction indicated by the arrow X and the image which has been formed on the liquid crystal panel 4b is projected onto the screen 2 as having the linearly polarized direction indicated by the arrow Y.

These linearly polarized images pass through the screen 2 while being transformed by the quarter wavelength film 22 into circularly polarized lights A and B whose directions of rotation differ from each other. The image lights which have thus passed the screen 2 are selectively separated by the glasses 70a and 70b which have different polarization directions. That is, the image formed on the liquid crystal panel 4a enters the eyes of the observer wearing the glasses 70a and the image formed on the liquid crystal panel 4b enters the eyes of the observer wearing the glasses 70b, selectively. Thus, the observers wearing the different glasses 70a and 70b can selectively see different images.

If one sees the screen 2 without the special glasses at this time, two images overlap because human eyes are incapable of discriminating the polarization. However, it becomes possible to separate and to see those two images selectively by viewing the screen 2 by wearing the special glasses 70a and 70b comprising the circularly polarizing films and the linearly polarizing films.

That is, the image formed on the liquid crystal panel 4a can be seen selectively by the glasses 70a because it has circularly polarized light in the direction of rotation indicated by the arrow A. At this time, the image formed on the liquid crystal panel 4b cannot be seen by the glasses 70a because it has circularly polarized light in the direction of rotation indicated by the arrow B.

On the other hand, the image formed on the liquid crystal panel 4b can be seen selectively by the glasses 70b because it has the circularly polarized light in the direction of rotation indicated by the arrow B. At this time, the image formed on the liquid crystal panel 4a cannot be seen by the glasses 70b because it has the circularly polarized light in the direction of rotation indicated by the arrow A.

Figure 3:
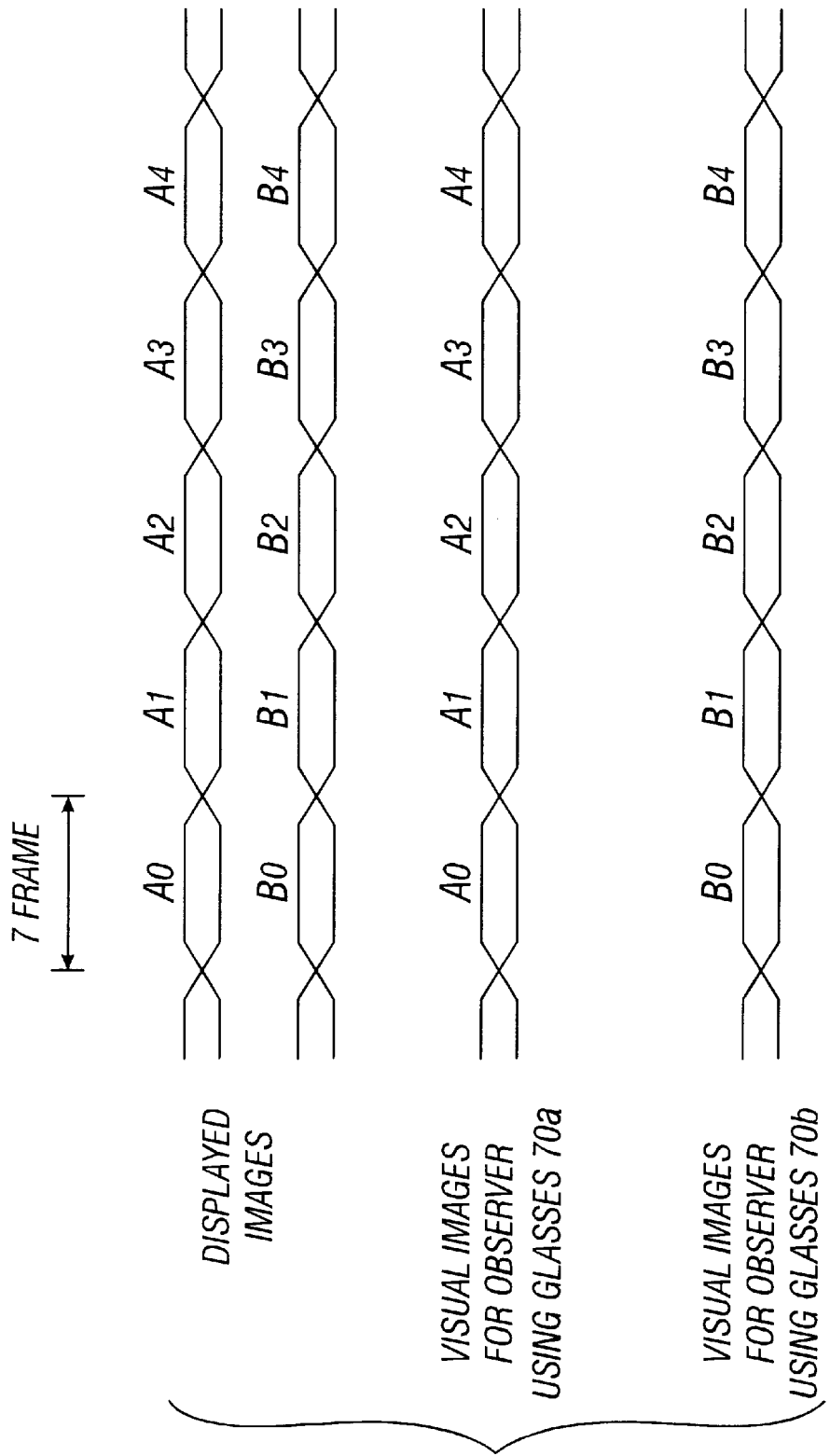
FIG. 3 is a time chart in displaying different images (second mode)

This operation will be explained with reference to a time chart in FIG. 3.

Image data of A0, A1, A2, A3, . . . are displayed from the liquid crystal panel 4a and image data of B0, B1, B2, B3, B4, . . . are displayed from the liquid crystal panel 4b. Then, the images of A0, A1, A2, A3, . . . enter the eyes of the first observer wearing the glasses 70a and the images of B0, B1, B2, B3, B4, . . . enter the eyes of the second observer wearing the glasses 70b selectively by wearing the special glasses described above. It becomes possible to observe the different images among the first and second observers without being influenced by inclinations of their head.

Next, an operation for the third mode in displaying normal images of TV, VTR, personal computers (PC) and the like will be explained. In this case, the same images are displayed from the liquid crystal panels 4a and 4b. Thereby, the observer can see brighter images without wearing the special glasses. At this time, an apparent resolution may be enhanced by projecting the same images simultaneously on the screen 2 while shifting either one of the images of the liquid crystal panels 4a and 4b in the horizontal or vertical direction by length of a pixel. For example, Further, although these images are the same images, an angle of visibility may be improved because right and left turn circularly polarized image lights are used.

Figure 4:
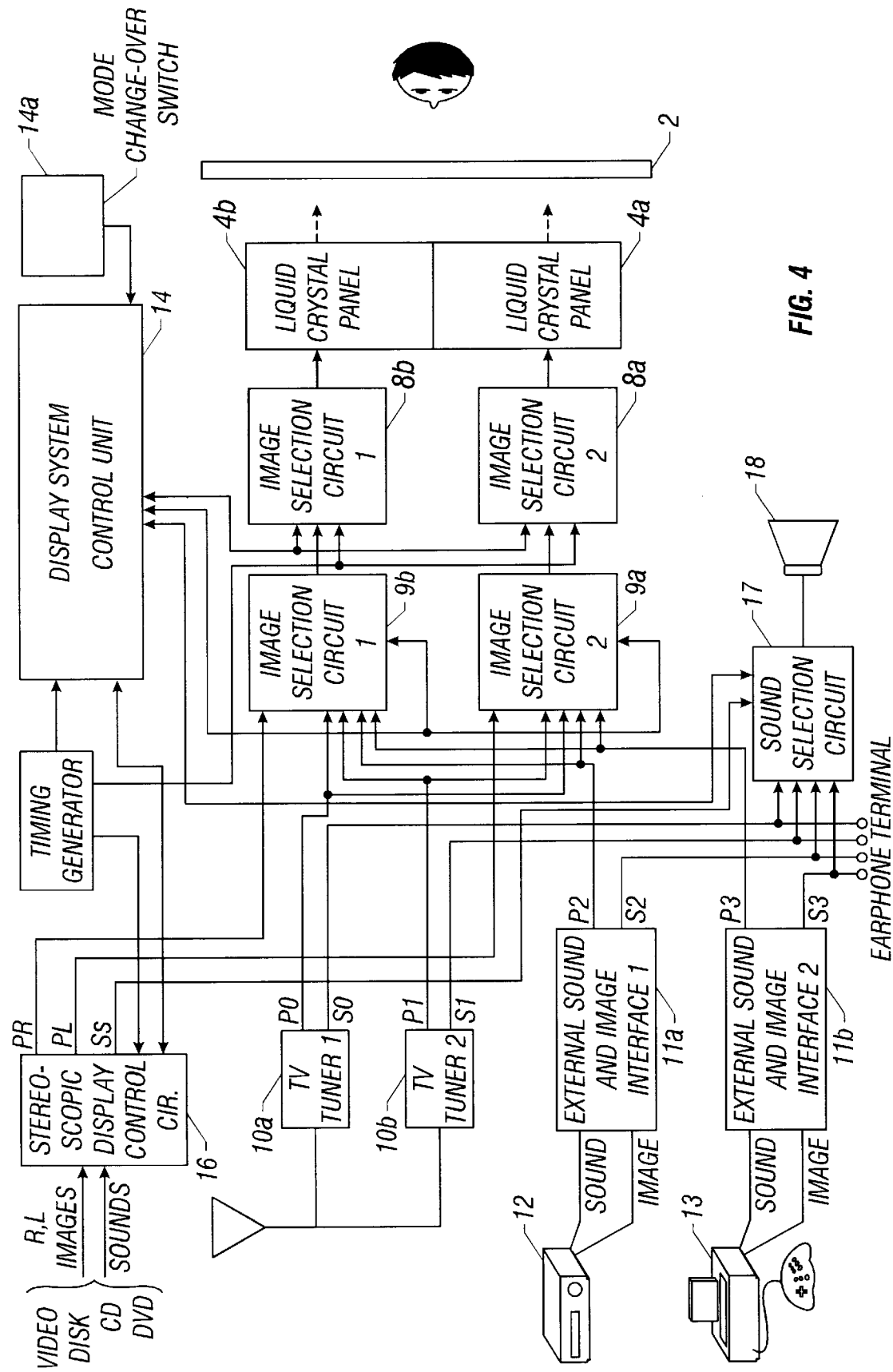
FIG. 4 is circuit diagram for displaying multi-purpose images.

Next, a structure of a circuit of a multi-purpose image display unit which allows to select various operation modes by one display unit will be explained with reference to FIG. 4. Here, the operation modes includes a first mode which allows to display stereoscopic images, a second mode which allows different observers to observe different images and a third mode for superimposing and displaying the same image.

The liquid crystal panel 4a is connected with an image control circuit 8a and an image selection circuit 9a. On the other hand, the liquid crystal panel 4b is connected with an image control circuit 8b and an image selection circuit 9b. The image control circuits 9a and 9b are connected with TV tuners 10a and 10b and external sound and image interfaces 11a and 11b, respectively. The external sound and image interface 11a is connected with a video tape recorder 12 and the external sound and image interface 11b is connected with a game machine 13. The image control circuit 8a and 8b and the image selection circuits 9a and 9b are connected to a display system control unit 14.

A timing generator 15 and a stereoscopic display control circuit 16 are connected respectively to the display system control unit 14. The timing generator 15 is connected also to a stereoscopic display control circuit 16 and to the image control circuits 8a and 8b, respectively. The TV tuners 10a and 10b and the external sound and image interfaces 11a and 11b are also connected a sound selection circuit 17 which is in turn connected to the display system control unit 14. Desirable sound is output from a speaker 18 by this sound selection circuit 17.

The timing generator 15 generates the reference timing of the system and the image control circuits 8a and 8b, the display system control unit 14 and the stereoscopic display control circuit 16 operate in synchronism with its reference signal. The display system control unit 14 controls and monitors status of the systems such as instruction to the image selection circuits 9a and 9b for selecting images, instruction to selecting sound selection circuit 17 for selecting sounds, instruction for operation modes to the image control circuits 8a and 8b, and processing for interruption from the image control circuits 8a and 8b and peripheral sensors (not shown).

The image selection circuits 9a and 9b select images input from the TV tuners 10a, 10b, and the outside. The image control circuits 8a and 8b adjust hue, brightness and contrast and the like. Besides that, the image control circuits 8a and 8b generate control signals such as image signals, timing signals and the like for the liquid crystal panels 4a and 4b. The sound selection circuit 17 selects an optional sound, outputs from the speaker 18 and controls sound volume and sound quality.

An operation of the circuit of the multi-purpose image display unit will be explained per each operation mode.

At first, a case of displaying a stereoscopic image will be explained (first mode).

In this case, the display system control unit 14 sets up hardware necessary for the first operation mode in response to the instruction of selecting the stereoscopic image set from the outside and selects image and sound effectively from the stereoscopic display control circuit 16. An image for right eye (R-image) and an image for left eye (L-image) are output from the stereoscopic display control circuit 16 in synchronism in parallel. Then, the image for left eye (L-image) is output and displayed on the liquid crystal panel 4a via the image selection circuit 9a and the image control circuit 8a. Meanwhile, the image for right eye (R-image) is output and displayed on the liquid crystal panel 4b via the image selection circuit 9b and the image control circuit 8b. Thus, the image for left eye and the image for right eye are output from the liquid crystal panels 4a and 4b and are projected onto the screen 2 in synchronism.

Next, the case of observing different images among different observers will be explained (second mode). Here, it will be explained by exemplifying a case of displaying an image of the video tape recorder and an image of the game machine onto the screen in the same time and of observing them among the different observers.

At first, in response to the instruction of the second mode, the display system control unit 14 selects the external sound and image interface 11a by the image selection circuit 9a and selects the external sound and image interface 11b by the image selection circuit 9b. Thereby, image data of the video tape recorder 12 is output and displayed on the liquid crystal panel 4a via the image selection circuit 9a and the image control circuit 8a. Meanwhile, image data of the game machine 13 is output and displayed on the liquid crystal panel 4b via the image selection circuit 9b and the image control circuit 8b. Thereby, the different images are output from the liquid crystal panels 4a and 4b and projected onto the screen 2 simultaneously.

Next, the case of superimposing and displaying the same images will be explained by exemplifying a case of superimposing and displaying images of the TV tuner 10a on the screen 2.

At first, in response to the instruction of the third mode, the display system control unit 14 selects the TV tuner 10a by the image selection circuits 9a and 9b. Thereby, an image of the TV tuner 10a is output to the liquid crystal panel 4a via the image selection circuit 9a and 8a. Further, the same image is output to the liquid crystal panel 4b via the image selection circuit 9b and the image control circuit 8b. Thereby, the same images are output from the liquid crystal panels 4a and 4b and are projected onto the screen 2 simultaneously.

Here, the selection of the operation modes described above is carried out by means of a mode change-over switch 14a for selecting the operation modes. Then, the display system control unit 14 outputs the selection instruction in response to a selection signal from the mode change-over switch 14a.

Figure 5A:
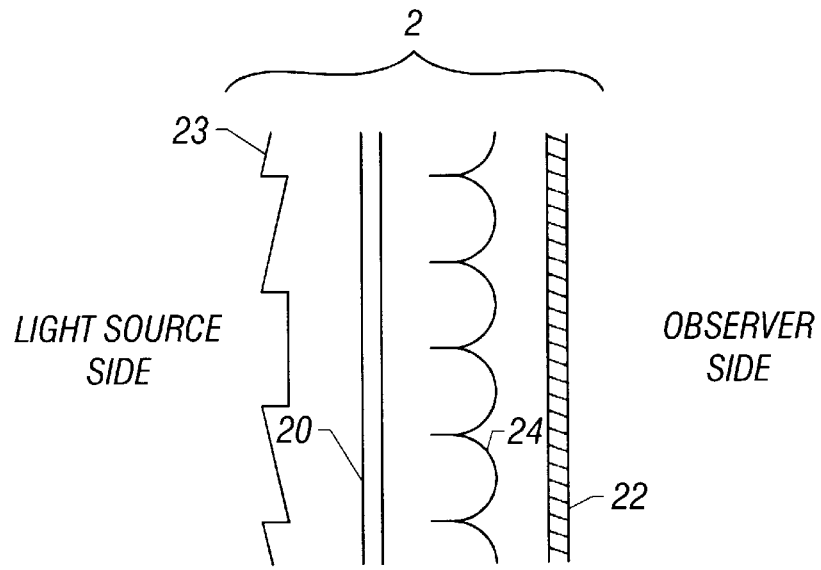
FIGS. 5A, 5B and 5C are drawings showing a structure of a screen.
Figure 5B:
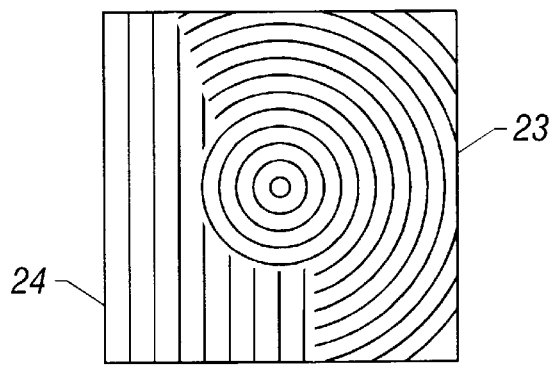
Figure 5C:
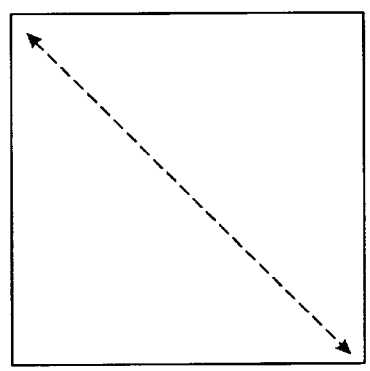

Next, the structure of the screen 2 used in the inventive display unit will be explained with reference to FIGS. 5A, 5B and 5C. Here, FIG. 5A is a section view thereof, FIG. 5B is a plan view thereof and FIG. 5C shows the optical axis of the quarter wavelength plate, respectively. In the present embodiment, the screen 2 is composed of, in the order from the light source side, a fresnel lens 23, an image-formation film 20, a lenticular lens 24 and the quarter wavelength film 22. In the present invention, the quarter wavelength film 22 is provided in a body with the screen 2 itself. It is because the polarization characteristics of the image light degrade due to scattering and the like in passing through the screen if the quarter wavelength film 22 is separated from the screen 2 and is disposed in front of the screen 2 (on the light source side), thus failing to view the image stereoscopically or causing after-image or darkness. The optical axis of the quarter wavelength film 22 (dotted line in FIG. 5C) is set at an angle of ±45° with vertical stripe of the lenticular lens 24.

Figure 6A:
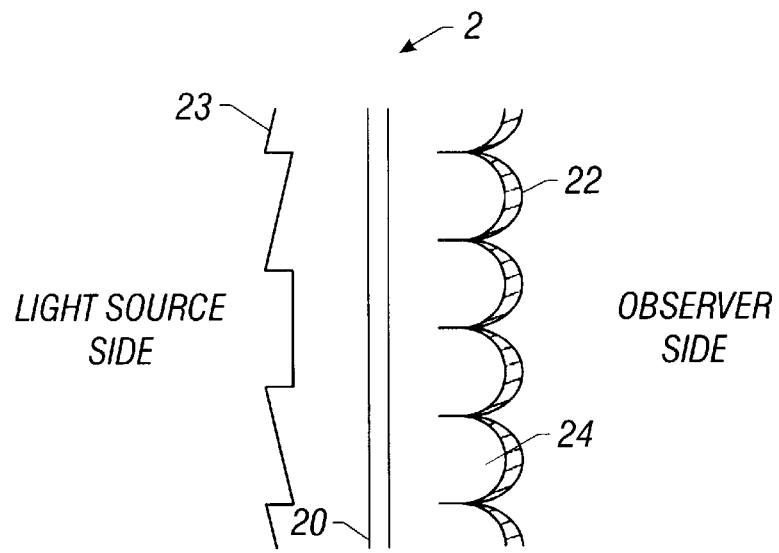
FIGS. 6A, 6B and 6C are drawings showing another structure of the screen.
Figure 6B:
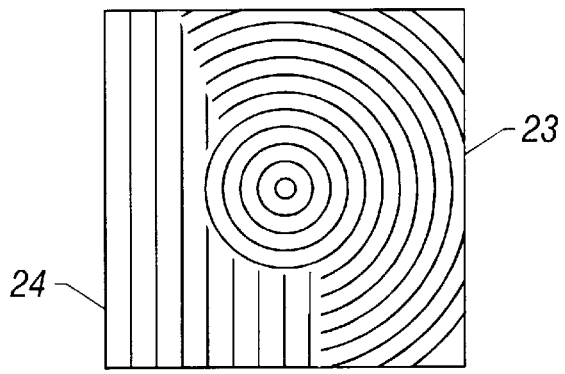
Figure 6C:
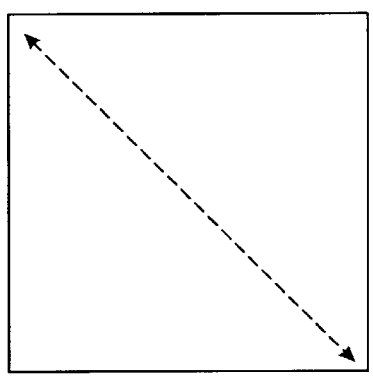

Another structure of the screen used in the inventive display unit will be explained below with reference to FIGS. 6A, 6B and 6C. Here, FIG. 6A is a section view thereof, FIG. 6B is a plan view thereof and FIG. 6C shows the optical axis of the quarter wavelength plate, respectively.

In the present embodiment, the screen 2 is composed of, in the order from the side of the light source, the fresnel lens 23, the image-formation film 20, the lenticular lens 24 and the quarter wavelength film 22. Then, the quarter wavelength film 22 is provided along the surface of the lenticular lens 24. The optical axis of the quarter wavelength film 22 (dotted line in FIG. 6C) is set at an angle of ±45° with vertical stripe of the lenticular lens 24. An incidence phase of image light through the lenticular lens 24 makes an angle of ±45° with respect to the optical axis of the quarter wavelength film 22.

Figure 7A:
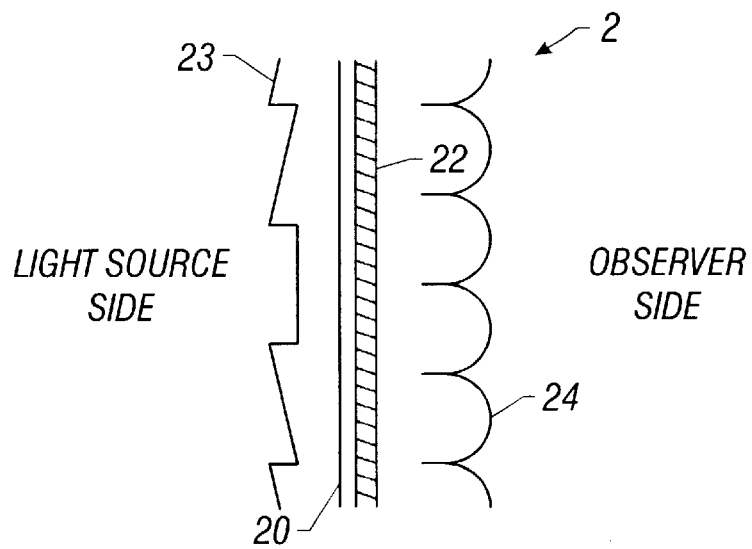
FIGS. 7A, 7B and 7C are drawings showing a still other structure of the screen.
Figure 7B:
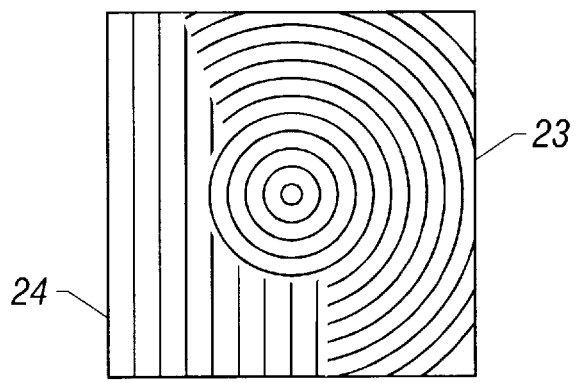
Figure 7C:
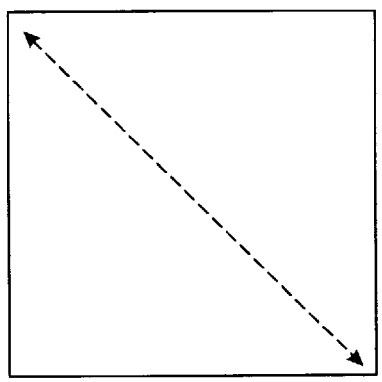

A still other structure of the screen used in the inventive display unit will be explained below with reference to FIGS. 7A, 7B and 7C. Here, FIG. 7A is a section view thereof, FIG. 7B is a plan view thereof and FIG. 7C shows the optical axis of the quarter wavelength plate, respectively. In the present embodiment, the screen 2 is composed of, in the order from the side of the light source, the fresnel lens 23, the image-formation film 20, the quarter wavelength film 22 and the lenticular lens 24. The image-formation film 20 and the quarter wavelength film 22 are disposed so as to contact each other. In the present embodiment, the image-formation film 20 and the quarter wavelength film 22 may be disposed by switching each other. The optical axis of the quarter wavelength film 22 (dotted line in FIG. 7C) is set at an angle of ±45° with respect to vertical fringes of the lenticular lens 24.

Next, the liquid crystal panels 4a and 4b used in the present invention will be explained with reference to FIG. 8. At first, in the structure at least one active matrix area and peripheral circuit areas are integrated on the same substrate. In this case, each active matrix area corresponds to each of the liquid crystal panels 4a and 4b in FIG. 1.

The integrated liquid crystal panel is characterized in that the peripheral circuits are disposed commonly to the plurality of active matrix areas. Thereby, the structure may be simplified and the reliability of the unit itself may be enhanced. Further, it allows to lower the production cost.

The structure of the liquid crystal panel 4 is explained below with reference to FIG. 8.

The liquid crystal panel 4 is constructed by integrating an active matrix area 104, a vertical scan control circuit 203 for driving the active matrix area 104 and a horizontal scan control circuit 201 for driving the active matrix area 104 on the same glass substrate or quartz substrate.

In displaying in color, three liquid crystal panels constructed as described above corresponding to R, G, B are prepared and combinations of those three liquid crystal panels are disposed in the right and left optical systems in FIG. 1, respectively. Accordingly, six liquid crystal panels as shown in FIG. 8 are necessary in total (e.g. FIG. 11) in order to construct the display unit as shown in FIG. 1.

Each of the active matrix area 104, the image-formation film 201 and the image-formation film 203 are formed as thin films directly integrated on the glass substrate or quartz substrate. In the concrete, they are formed from thin film transistors by using thin film silicon semiconductors having crystalinity.

Figure 8:
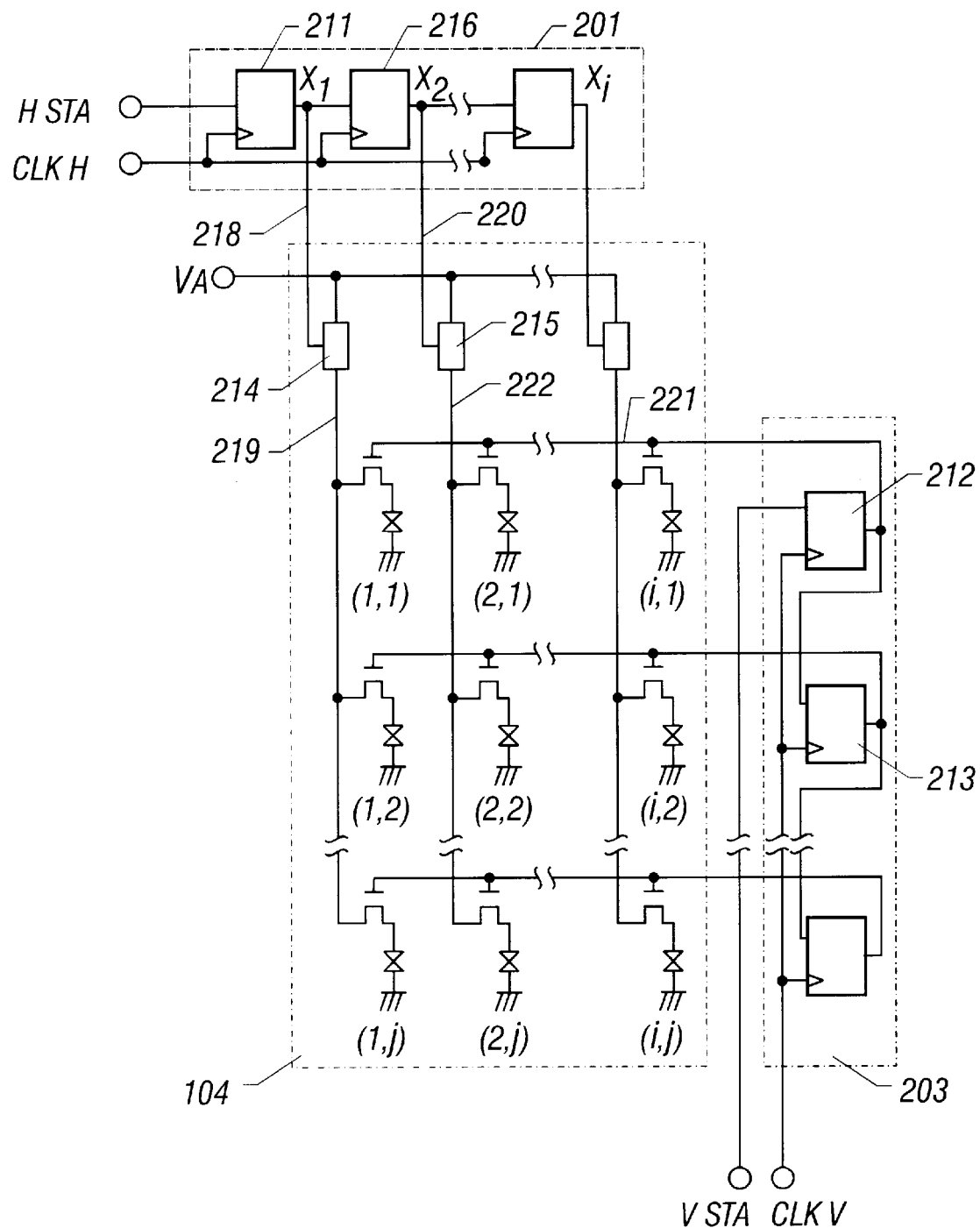
FIG. 8 is a diagram showing a structure of a liquid crystal panel.

Further, although not clear from the figure, a rubbing direction of an orientation film for orienting the liquid crystal is set so that it makes an angel or just 90° with a rubbing direction of an orientation film of the active matrix area 104 of the adjoining liquid crystal panel in the structure shown in FIG. 8 (see FIG. 1).

In the present embodiment, the structure described above is realized by using TN type liquid crystal. This structure makes polarization directions of the images formed in active matrix areas an angel of 90° each other.

It is noted that the rubbing direction in the present specification means to be an orientation as a whole. That is, in a case of an orientation in which the orientation changes subtly in a very small area, the orientation is defined by a direction which orients the liquid crystal as a whole, taking no account with very small area which changes the orientation subtly.

An method for operating the liquid crystal panel integrated as shown in FIG. 8, particularly, an operation of the active matrix area 104 is explained briefly below. It is noted that the similar operation is carried out in the same timing in the other active matrix areas.

In FIG. 8, each of flip-flop circuits 211, 216, 212, 213 is a circuit which can assume two stable states. Consider a case when a level of an input (at point X1) of the flip-flop circuit 216 is H (logically High level) and that of an output (at point X2) thereof is L (logically Low level) for example. When a rising edge of CLKH (operation clock of the horizontal scan control circuit) is input here, the output thereof turns to H level. That is, the point X2 turns to H level. Then, this state is maintained unless a next CLKH rising edge is input.

Further, consider a case when the state of the input of the flip-flop circuit 216 is L and the output thereof is H for example. When the rising edge of the CLKH is input here, the output thereof turns to L level.

Further, consider a case when the states of the input and the output of the flip-flop circuit 216 are both L. When the rising edge of CLKH is input at this time, the output is maintained at the L level.

At first, the rising edge of the CLKV (operation clock of the vertical scan control circuit) is input to the flip-flop circuit 212 of the vertical scan control circuit 203. Here, VSTA (vertical scan timing enable signal) is blanked out by the CLKV.

That is, the output of the flip-flop circuit 212 turns to H level when the rising edge of the CLKV enters the flip-flop circuit 212 in the state wherein the H level signal of the VSTA is applied to the input of the flip-flop circuit 212. As a result, a signal level on a line Y1 turns to H level.

When the signal level of the line Y1 turns to H level, thin film transistors of each of pixels indicated respectively by addresses (1, 1), (2, 1), (i, 1) are all turned ON.

In this state, HSTA (horizontal scan timing enable signal) to be input is blanked out in the flip-flop circuit 216 at the rising edge of CLKH (operation clock of the horizontal scan control circuit). As a result, the signal level in X1 turns to H.

Because inputs of the flip-flop circuits on and after the flip-flop circuit 216 are all on L level in the stage when the CLKH described above is input, the output of the flip-flop circuits on and after the flip-flop circuit 216 are all on L level in this state.

Then an image sampling signal line 218 turns to H level. As a result, image data VA is taken in at a sample and hold circuit 214. Then, a signal corresponding to predetermined image data flows through an image signal line 219. That is, predetermined image signals are applied to thin film transistors of each pixel indicated by addresses (1, 1), (1, 2), . . . (1, j).

In this state, the thin film transistors of each pixel indicated by the addresses (1, 1), (2, 1), . . . (i, 1) are all turned ON. Accordingly, image information is written only to the pixel at the address (1, 1).

Next, the output of the flip-flop circuit 211 turns to L level by the next rising edge of the CLKH. The output of the flip-flop circuit 216 also turns to H level. Thus, the level of the point X2 turns to H. In this state, points indicated by Xi other than X2 are all on L level.

As a result, predetermined image data is taken in at a sample and hold circuit 215 and information is written to the address (2, 1).

Thus, information is written up to the address (i, 1) sequentially in accordance to the clock signal of the CLKH.

When the information has been written to the line Y1, the output of the flip-flop circuit 212 turns to L level and the output of the flip-flop circuit 213 turns to H level by input of a next rising edge of the CLKV.

Information is written thus to the line Y2. Information is written sequentially to each pixel and when information is written finally to the address (i, j), display of one frame (or one field) is finished. This frame is repeated by 30 times per second for example. Images are thus displayed.

Next, a concrete structure of the display unit having the optical system described above is explained with reference to FIG. 9A to 9C.

Figure 9A:
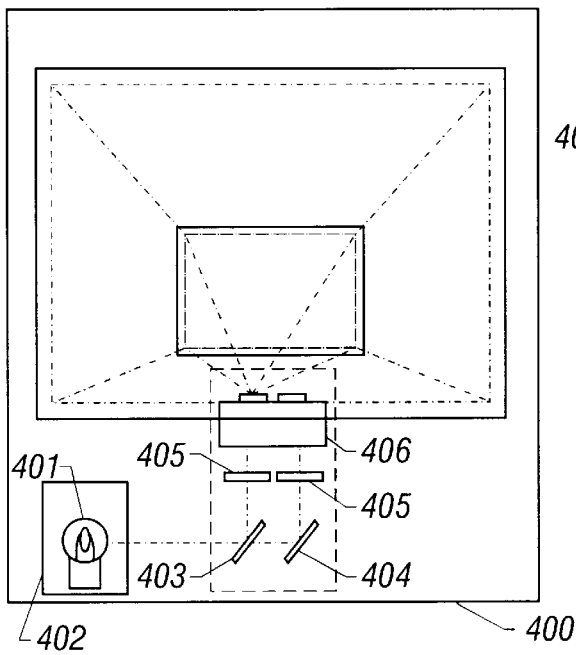
FIG. 9 is a diagram showing a concrete structure of the display unit.
Figure 9C:
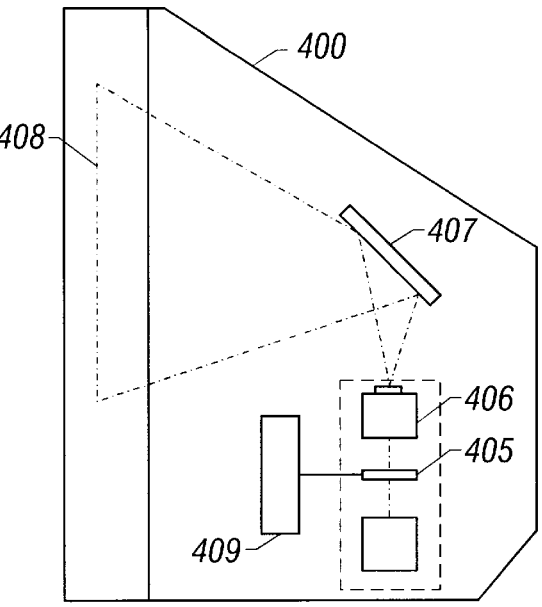
Figure 9B:
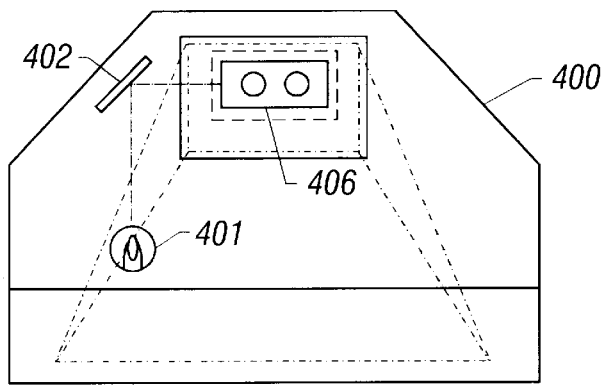

In FIGS. 9A to 9C, liquid crystal panel 405 has the active matrix area 104 as shown in FIG. 8. In the FIGS. 9A to 9C, light from a light source 401 is reflected by a mirror 402 and is reflected and divided into two beams by a half mirror 403 and a mirror 404. These beams enter each liquid crystal panel 405 and are optically modulated in a predetermined manner.

Two images obtained by optically modulating at each liquid crystal panel 405 are projected respectively via an optical system 406.

The projected light from the optical system 406 is reflected by a mirror 407 and is projected onto a screen 408. The two images optically modulated at the liquid crystal panels 405 are superimposed and projected on the screen 408. Here, the polarization of the two images make an angle of 90° each other.

Figure 10:
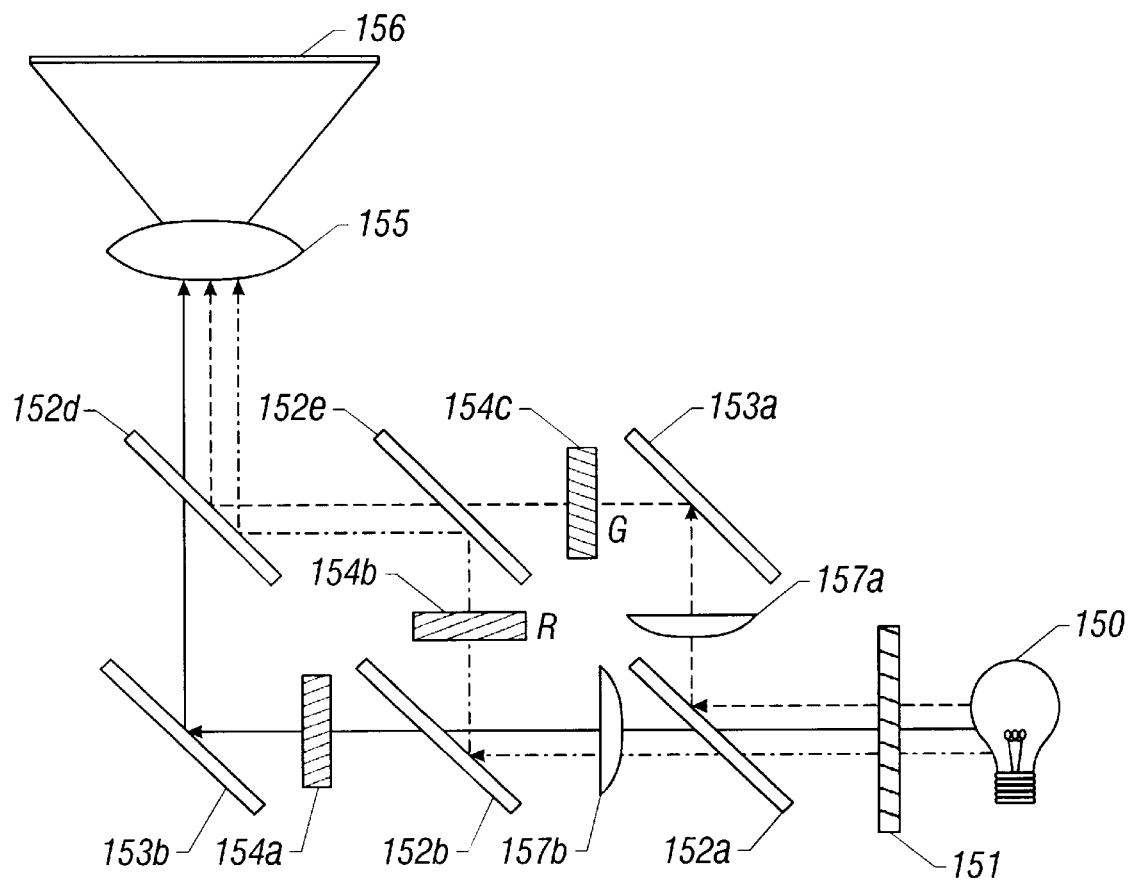
FIG. 10 is a detailed diagram showing an optical structure of the display unit in FIG. 9.

FIG. 10 shows a detailed structure of one of the optical systems (either one of the right and left optical systems in FIG. 1). Light from a light source 150 is separated into red, green and blue lights via dichroic mirrors for color separation 152a and 152b and enters a red liquid crystal panel 154b, a green liquid crystal panel 154c and a blue liquid crystal panel 154a, respectively, to be optically modulated. The image lights optically modulated by each of the liquid crystal panels 154a, 154b and 154c are projected onto a screen 156 by a projection lens 155 via dichroic mirrors for color synthesis 152e and 152d. Here, the reference numeral (151) denotes a UV filter, (153a and 153b) total reflection mirrors and (157a and 157b) condenser lenses.

Another structure of the liquid crystal panel will be explained below with reference to FIG. 11. The present embodiment is a case when a number of active matrix areas are integrated.

Figure 11:
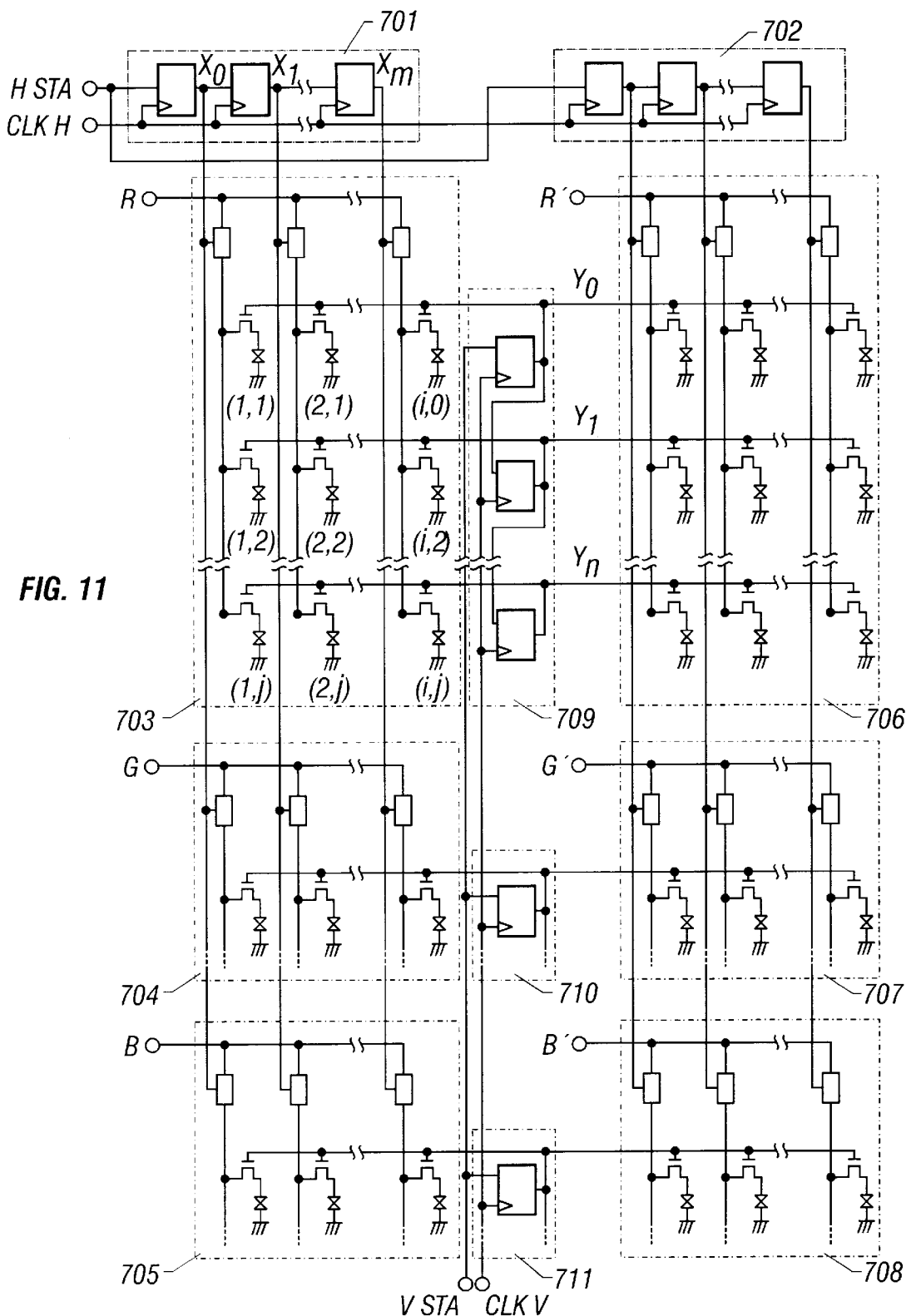
FIG. 11 is diagram showing another structure of a liquid crystal panel.

FIG. 11 shows an outline structure of the liquid crystal panel in which the active matrix areas are integrated. This liquid crystal panel shown in FIG. 11 is capable of forming two color images composed of R, G, B independently.

In the structure shown in FIG. 11, horizontal scan of the active matrix areas 703, 704 and 705 is controlled by a horizontal scan control circuit 701. Further, horizontal scan of the active matrix areas 706, 707 and 708 is controlled by a horizontal scan control circuit 702. Each of these active matrix areas corresponds to the liquid crystal panel 4 in FIG. 1.

Further, vertical scan of the active matrix areas 703 and 706 is controlled by a vertical scan control circuit 709. Further, vertical scan of the active matrix areas 704 and 707 is controlled by a vertical scan control circuit 710. A vertical scan control circuit 711 controls vertical scan of the active matrix areas 705 and 708.

In the structure shown in FIG. 11, a rubbing direction (orientation) of orientation films disposed on the active matrix areas 703 to 705 makes an angle of 90° with a rubbing direction (orientation) of orientation films disposed on the active matrix areas 706 to 708.

The above-mentioned structure may be integrated on the same substrate, thus allowing to simplify the whole structure and to lower the production cost. In particular, it is very useful to be able to dispose the horizontal scan control circuits/vertical scan control circuits commonly to the plurality of active matrix areas.

Next, a concrete structure of the display unit having the optical system in FIG. 11 will be explained with reference to FIGS. 12A to 12C. In the structure shown in FIGS. 12A to 12C light from a light source 602 is reflected by a mirror 604 and is divided by dichroic mirrors 608, 609 and 610 into lights having wavelength domains corresponding to G, B, R, respectively. Then, each of those lights is input to the integrated liquid crystal panel 611 shown in FIG. 11.

The light is optically modulated at each pixel area corresponding to R, G, B in the liquid crystal panel 611 and an image of G is reflected by a mirror 612, an image of B is reflected by a half mirror 613 and an image of R is reflected by a half mirror 614. A color image thus combined is reflected further by a mirror 617 via an optical system 615 and is projected onto a screen 618.

Meanwhile, light from the light source 602 is reflected by the mirror 604 and is divided into lights corresponding to GBR by dichroic mirrors 605, 606 and 607. Those lights are optically modulated by a liquid crystal panel 611. The optically modulated lights corresponding to RGB are combined by a group of mirrors not shown and are projected onto the screen 618 via an optical system 616 and the mirror 617.

As described above, according to the present invention, the display unit is provided with the first and second liquid crystal panels for displaying images. And linearly polarized image lights output respectively from each of the liquid crystal panels are projected onto the surface of the screen so that their polarization directions differ from each other. Then, the projected linearly polarized lights are transmitted through the screen after transforming into circularly polarized lights by transformation means provided in the screen. Thereby, the circularly polarized image lights may be transmitted to the observers without degrading the polarization characteristics by the optical system such as the lenses and screen.

Further, according to the present invention, the observer can enjoy various modes by one display unit by allowing to arbitrarily select either the first mode which allows to display stereoscopic images, the second mode which allows to observe different images among different observers and the third mode for superimposing and displaying the same images.

What is claimed is:

1. A display system which allows an image to be observed from a back surface of a screen on an opposite side of a light source by forming the image on the screen via the light source, comprising:
   a first liquid crystal panel for displaying images;
   a second liquid crystal panel for displaying images disposed so as to be adjacent to said first liquid crystal panel;
   means for projecting linearly polarized image lights output respectively from said first and second liquid crystal panels on said screen simultaneously so that polarization directions of the linearly polarized image lights differ from each other; and
   means for transforming projected linearly polarized lights into circularly polarized lights, said means for transforming provided in said screen.

2. The display system according to claim 1, wherein said means for transforming is a quarter wavelength plate and said means for projecting projects each of the linearly polarized image lights onto said screen so that polarization axes of the linearly polarized image lights make (an angle) angles of 45° with respect to an optical axis of said quarter wavelength plate, respectively.

3. The display system according to claim 2, wherein said quarter wavelength plate is disposed on the back surface of said screen and transforms the linearly polarized image lights which have transmitted from a front surface of said screen into the circularly polarized lights at the back surface of said screen.

4. The display system according to claim 2, wherein said screen further comprises:
   an image-formation film for forming images;
   a fresnel lens provided on the light source side with respect to said image-formation film; and
   a lenticular lens provided on an observer side with respect to said image-formation film.

5. The display system according to claim 2, wherein said means for projecting comprises:
   a first polarization plate disposed on a light source side of said first liquid crystal panel;
   a second polarization plate which is disposed on a screen side of said first liquid crystal panel and which has a polarization direction that makes an angle of 90° with respect to a polarization direction of said first polarization plate;
   a third polarization plate disposed on a light source side of said second liquid crystal panel; and
   a fourth polarization plate which is disposed on a light source side of said second liquid crystal panel and which has a polarization direction that differs by 90° from a polarization direction of said third polarization plate;
   wherein liquid crystal in said first and second liquid crystal panels is oriented to form an angle of 90°.

6. The display system of claim 1, which allows stereoscopic images to be displayed by allotting glasses for selectively separating lights output from said first and second liquid crystal panels which have passed said screen for right and left eyes of an observer.

7. The display system according to claim 6, wherein said glasses comprise circularly polarizing means by which directions of rotation of circularly polarized light differ each other for the right and left eyes of the observer and linearly polarizing means by which polarization directions of linearly polarized lights differ each other for the right and left eyes.

8. A display system according to claim 1, which allows different images to be observed among a first observer and a second observer by allotting first glasses for selectively transmitting a first image light of said first liquid crystal panel among image lights which have passed through said screen to said first observer and second glasses for selectively transmitting a second image light of said second liquid crystal panel to said second observer, respectively.

9. The display system according to claim 8, wherein said first and second glasses comprise circularly polarizing means by which directions of rotation of circularly polarized lights differ from each other and linearly polarizing means by which polarization directions of linearly polarized lights differ from each other.

10. A display system according to claim 1, wherein same images are displayed respectively on said first and second liquid crystal panels and the same images are superimposed and displayed on said screen.

11. The display system according to claim 10, wherein the same images are applied to said screen simultaneously while shifting either image of said first or second liquid crystal panel in a horizontal or vertical direction by a length of pixel.

12. The display system according to claim 1, further comprising:
   first and second polarization plates disposed on a light source side and a screen side of said first liquid crystal panel, respectively, wherein a polarization direction of the second polarization plate makes an angle of 90° with respect to a polarization direction of said first polarization plate;
   third and fourth polarization plates disposed on a light source side and a screen side of said second liquid crystal panel, respectively, wherein a polarization direction of said fourth polarization plate differs by 90° from a polarization direction of said third polarization plate; and
   wherein liquid crystal in said first and second liquid crystal panels is oriented to form an angle of 90°.

13. A display system according to claim 1, wherein said first and second liquid crystal panels display same images and the same images are superimposed on said screen.

14. A display system for displaying multi-purpose images which allows an image to be observed from a back surface of a screen on an opposite side from a light source through glasses allotted to an observer by forming the image on the screen via the light source, comprising:
   a first liquid crystal panel for displaying first images;
   a second liquid crystal panel for displaying second images disposed so as to adjacent to said first liquid crystal panel;
   means for projecting linearly polarized image lights output from said first and said second liquid crystal panels respectively on said screen simultaneously so that polarization directions of said linearly polarized image lights differ from each other;
   means for transforming said linearly polarized lights into circularly polarized lights, wherein said means for transforming is provided in said screen;
   input means for inputting a plurality of external images into said display system;
   stereoscopic display control means for output images for right and left eyes;
   mode selection means for selecting a first mode which allows images to be displayed stereoscopically, a second mode which allows different images to be observed and a third mode for superimposing and displaying same images; and display control means for controlling so as to display images for right and left eyes on said first and second liquid crystal panels respectively by said stereoscopic display control means in response to a selection of the first mode, so as to input different images from said input means to display on said first and second liquid crystal panels respectively in response to a selection of the second mode and so as to input the same images from said input means to display on said first and second liquid crystal panels in response to a selection of the third mode.

15. The display unit according to claim 14, wherein said means for transforming is a quarter wavelength plate and said means for projecting projects each of the linearly polarized image lights onto said screen so that the linearly polarized image lights differ by 45° with respect to an optical axis of said quarter wavelength plate, respectively.

16. The display unit according to claim 15, wherein said quarter wavelength plate is disposed on the back surface of said screen and transforms the linearly polarized image light which has transmitted from said screen into the circularly polarized lights at the back surface of said screen.

17. The display unit according to claim 15, wherein said screen further comprises:

an image-formation film for forming images;

a fresnel lens provided on the light source side with respect to said image-formation film; and a lenticular lens provided on an observer side with respect to said image-formation film.

18. A display system comprising:

a light source;

a screen which allows an image to be observed from a back surface of a screen;

a first liquid crystal panel for projecting first linearly polarized lights; and a second liquid crystal panel for projecting second linearly polarized lights;

wherein said first and second linearly polarized lights are projected on a front surface of said screen simultaneously so that polarization directions of said first and second linearly polarized lights differ from each other, and wherein said screen transforms said first and second linearly polarized lights into circularly polarized lights.

19. The display system according to claim 18, wherein said screen comprises a quarter wavelength plate, and wherein a polarization axis of the first and second linearly polarized lights make an angle of 45° with an optical axis of said quarter wavelength plate.

20. The display system according to claim 19, wherein said quarter wavelength plate is disposed on the back surface of said screen and transforms a linearly polarized image light which has transmitted from the front surface of said screen into the circularly polarized lights at the back surface of said screen.

21. The display system according to claim 18, wherein said screen further comprises:

an image-formation film;

a fresnel lens provided on a light source side with respect to said image-formation film; and a lenticular lens provided on an observer side with respect to said image-formation film.

22. The display system according to claim 18, further comprising glasses for observing stereoscopic images by selectively separating image lights from said first and second liquid crystal panels for right and left eyes after said image lights have passed through said screen.

23. The display system according to claim 18, further comprising first glasses for a first observer for selectively transmitting a first image light from said first liquid crystal panel and second glasses for a second observer for selectively transmitting second image light of said second liquid crystal panel.

24. A display system comprising:

a light source;

a screen which allows an image to be observed from a back surface of said screen through glasses allotted to at least one observer;

a first liquid crystal panel for outputting first images;

a second liquid crystal panel for outputting second images; and input means for inputting a plurality of external images into said display system, wherein first and second images are linearly polarized images having different polarization directions from each other, said linearly polarized images projected on a surface of said screen simultaneously, and wherein said screen comprises transformation means for transforming said linearly polarized images into circularly polarized lights.

25. A display system according to claim 24, wherein said display system allows images to be displayed stereoscopically using glasses.

26. A display system according to claim 24, wherein said display system allows different images to be observed by at least two observers.

27. The display unit according to claim 24, wherein said screen comprises:

an image-formation film for forming images;

a fresnel lens provided on a light source side with respect to said image-formation film;

a lenticular lens provided on an observer side with respect to said image-formation film; and a quarter wavelength plate.

* * * * *